(12) United States Patent
Van Breemen

(10) Patent No.: US 7,374,839 B2
(45) Date of Patent: May 20, 2008

(54) METHOD AND APPARATUS FOR DISSOLVING CRYSTALS

(76) Inventor: Charles A. Van Breemen, 308 Vine Ave., Clearwater, FL (US) 33755

(*) Notice: Subject to any disclaimer, the term of this patent is extended or adjusted under 35 U.S.C. 154(b) by 481 days.

(21) Appl. No.: 10/926,995

(22) Filed: Aug. 27, 2004

(65) Prior Publication Data
US 2005/0046383 A1 Mar. 3, 2005

Related U.S. Application Data

(60) Provisional application No. 60/498,043, filed on Aug. 27, 2003.

(51) Int. Cl.
*H01M 6/50* (2006.01)
*H02J 7/00* (2006.01)
*H02J 7/04* (2006.01)

(52) U.S. Cl. .................. 429/49; 320/107; 320/139
(58) Field of Classification Search .................. 429/49; 320/107, 139
See application file for complete search history.

(56) References Cited

U.S. PATENT DOCUMENTS

| 5,633,575 A | 5/1997 | Gali |
| 5,648,714 A | 7/1997 | Eryou et al. |
| 5,891,590 A | 4/1999 | King |
| 6,078,166 A | 6/2000 | Taricco |

*Primary Examiner*—Patrick Ryan
*Assistant Examiner*—Thomas H. Parsons
(74) *Attorney, Agent, or Firm*—Miles & Stockbridge P.C.

(57) ABSTRACT

A method is described for a dissolving crystals formed in a side reaction to an oxidation-reduction reaction. A low frequency substantially square wave signal less than 10 kilohertz is applied across the battery terminals to dissolve unwanted crystals.

8 Claims, 4 Drawing Sheets

METHOD AND APPARATUS FOR DISSOLVING CRYSTALS

RELATED APPLICATION DATA

The application claims the benefit of and priority under 35 USC §119(e) to U.S. Application No. 60/498,043 filed Aug. 27, 2003, entitled "Method for Dissolving Crystals", which is incorporated herein by reference its entirety.

BACKGROUND OF THE INVENTION

1. Field of the Invention

The invention relates in general to a method and apparatus for dissolving crystals that form as a result of an unwanted side reaction in conjunction with oxidation-reduction chemical reactions, and more particularly to a method and apparatus of minimizing buildup of chemical deposits on battery plates and terminals by applying a low frequency square wave across the terminals.

2. Description of Related Art

Oxidation-reduction is a very common and an important type of chemical reaction. Oxidation-reduction reaction includes by definition any chemical reaction in which electrons are transferred. Oxidation-reduction reactions have many far reaching and useful applications, for example combustion, photosynthesis, metabolism, bleaching agents, electrochemistry, batteries, etc. In many instances however, oxidation-reduction reaction also produce a buildup of undesirable chemical deposits in the form of crystals, as in the case of a lead acid battery, where lead(II) sulfate ($PbSO_4$) and lead(IV) sulfate ($Pb(SO_4)_2$) crystals are produced. A battery, such as used in the automotive field, is illustrative of one type of oxidation-reduction reaction. A characteristic of such electrolyte type batteries, particularly lead acid batteries, is that chemical compound deposits slowly build-up on plates to partially or entirely cover and displace the normal plate surfaces. Low current charging does not remove the deposits effectively. With the passage of time, the deposits crystallize and choke the battery by blocking electrolyte movement. During the process of charging a battery, the lead on one of the plates is converted to lead(IV) oxide ($PbO_2$) and lead oxide on the other plate is reduced to lead. Under certain conditions, lead(II) sulfate ($PbSO_4$) and lead(IV) sulfate ($Pb(SO_4)_2$) crystals are formed as an undesirable byproduct. The lead sulfate crystals coat the electrodes and prevent contact between the lead of the electrode and the sulfuric acid of the electrolyte, thus reducing the surface area available for the chemical reaction to take place. This, in turn, reduces the total power output capacity of the battery. Although some of the lead(II) sulfate is dissolved during charging, lead(II) and lead(IV) sulfate can build up to a point where the battery is considered totally unusable. Fast charging has been suggested, but fast charging frequently overheats the battery and warps the lead plates in a lead acid battery effectively shorting the plates so that the battery does not hold a charge.

Batteries using other electrolytes also suffer from maintenance and charging problems that need to be addressed. A nickel cadmium battery serves as an example. A nickel cadmium battery uses an oxidation-reduction chemical reaction to create the desired electrical current. One of the plates of a nickel cadmium battery uses a material called nickel sponge, a form of almost pure nickel in a very open structure, which gives it a large surface area. The large surface area is necessary to generate the maximum amount of current. As this battery is used, undesirable crystals form in the lattice of the nickel sponge and block the electrolyte from contacting the surface of the electrode. These undesirable crystals can build up to a point where the battery becomes unusable.

Oxidation-reduction is also referred to as redox. Redox chemical reaction involves the use of electron donor salts and electron hungry salts, usually in a resin matrix or bed with large surface areas. There are other redox processes that use electrolysis to aid the reaction. These would be classed as electrochemical. In these processes, complex, multiple step oxidation-reduction reactions take place such as in the leaching of gold and other precious metal ores, and when side reactions forming unwanted crystals take place, these crystals can be dissolved using my invention. Another example of an electrochemical redox process is the electrolysis of water to form hydrogen and oxygen. Fouling of the electrodes can occur by the build up of calcium carbonate.

It is therefore an object of my invention to prevent or minimize the buildup of undesirable and unwanted chemical deposits occurring from oxidation-reduction chemical reactions.

Others have recognized that for specific applications such as lead acid batteries a resonant excitation of the sulfate crystals in the battery may reduce crystal formations.

For example U.S. Pat. No. 5,891,590 of King discloses a system employing a signal generator coupled by a transformer to deliver an alternating current signal of selected frequency at the output of the transformer secondary winding. The signal is rectified to deliver a train of direct current pulses through an output circuit at a high frequency range of 10,000 to 52,000 hertz to cover the crystals to crack and soften and eventually dissolve in the battery solution. The system of King is used with lead acid batteries and, accordingly, is not adaptable to all oxidation reduction process. It also requires high and variable frequency on the range of 20 Khz to 32 Khz.

U.S. Pat. No. 6,078,166 of Taricco discloses a battery charger employing an external AC power source for recharging lead-acid batteries. Like King, it operates at frequencies above 10,000 hertz. Noise created by the resonant excitation is fed back to the modulator to create and or enhance the noise on the rail voltage to recharge the battery.

The present invention overcomes the disadvantages of such known arrangements which fail to effectively act on crystals having a resonant frequency below 10 Khz. Crystals formed as a result of oxidation-reduction are of varying sizes and these single frequency operation systems of the prior art only effects crystals resonant at that frequency.

The subject invention is more versatile in that it will work in all oxidation-reduction reactions, is more effective and advantageous because it will stimulate a larger variety of crystal sizes and will work with or without an external power sources. Another advantage of the present invention is that it is capable of delivering more power to stimulate a larger surface area of crystal formation known arrangement and is simpler and more economical, requiring only one integrated circuit and one transistor.

Another object of my invention is to provide an improved method for dissolving unwanted crystals that form as a by product of an oxidation-reduction chemical reaction.

Still another object of my invention is to provide a system for stimulating the natural frequency of the crystals of varying sizes formed as a result of an oxidation-reduction reaction, thus causing them to break up and dissolve.

Yet another object of my invention is to provide an improved system for stimulating unwanted crystals formed on battery plates causing them to break up and dissolve.

SUMMARY OF THE INVENTION

The principle of operation of the subject invention is based on the fact that crystals of different sizes have different natural resonant frequencies and that such crystals can be effectively stimulated by a square wave or electrical signal of less than 10 kilohertz. When stimulated at their natural frequency, the crystals will dissolve. The present invention utilizes a low frequency IC oscillator to produce an intermittent direct current square wave signal that is imposed upon the direct current rail voltage of the voltage supply source. This square wave alternates between the rail voltage and some higher voltage. A square wave is defined as an intermittent DC signal going between two voltages with the time interval at the first voltage ($t_1$) equal to the time interval at the second voltage ($t_2$). Rail voltage is defined as the basic direct current voltage supplied by the battery or other direct currents power source. By using a square wave signal it is not necessary to find and transmit the exact frequency of each crystal. The only requirement is that the frequency of the square wave signal be lower than the lowest natural frequency of the crystal to be dissolved. Ten kilohertz is typically the lowest frequency that is effective to dissolve most crystalline structures. In accordance with my invention, the harmonic sequences of a low frequency square wave of less than 10 kilohertz is used to stimulate all crystals. Most periodic signals can be represented by a summation of a number of different sine waves. The Fourier Series for a square wave includes all other frequencies above it. This means that a square wave signal of less than 10 kilohertz will stimulate all harmonic frequencies above 10 kilohertz. This is the most effective way to stimulate a broad spectrum of crystal frequencies and avoiding use of a variable frequency source.

DESCRIPTION OF THE PREFERRED EMBODIMENTS

Figure 1:
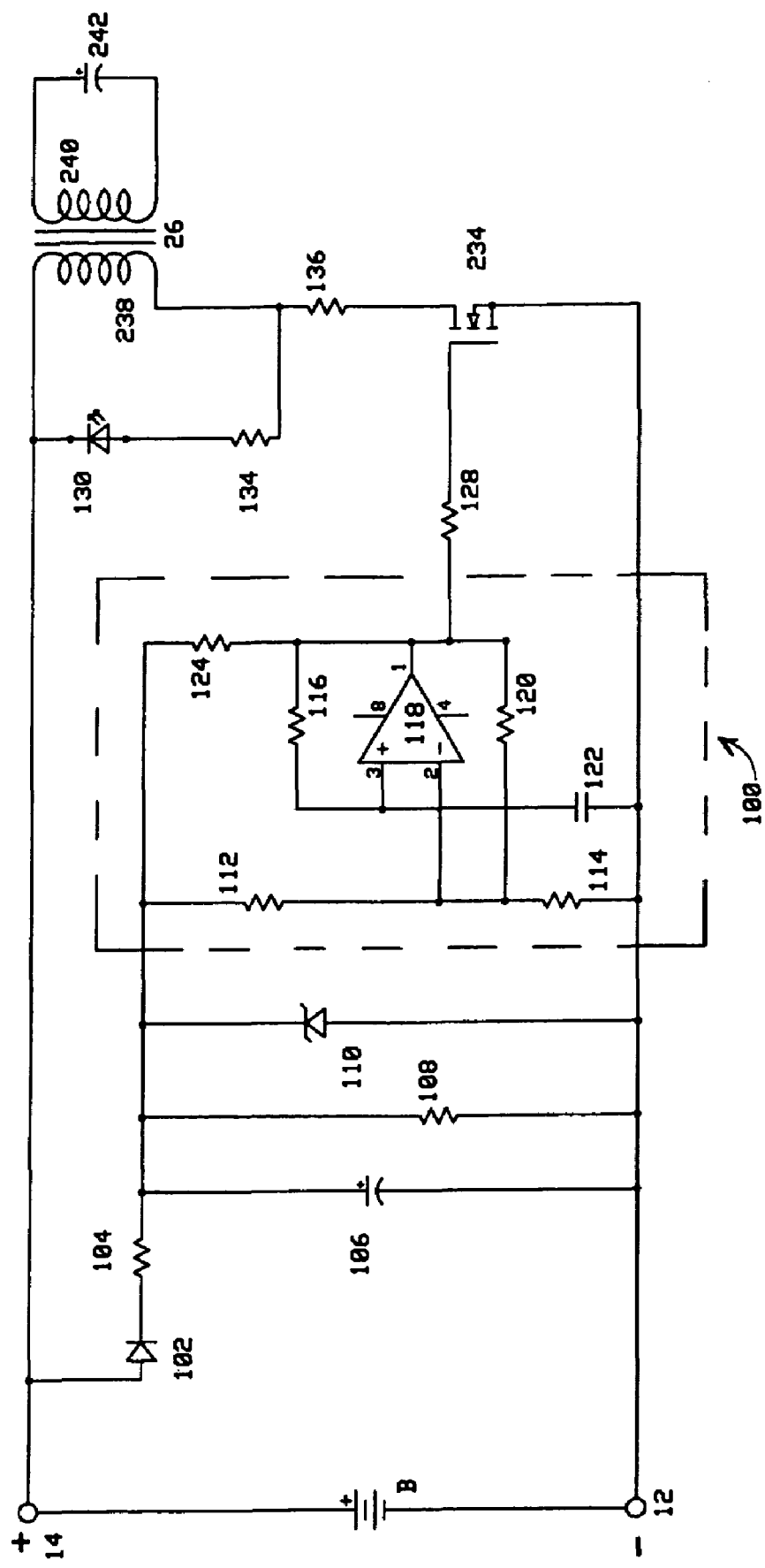
FIG. 1 is circuit diagram or schematic of the preferred embodiment of my invention.

A preferred embodiment of the invention is shown in FIG. 1. Power from battery B is supplied across the positive input 14 and the negative input 12 Inputs 12 and 14 also become the outputs for a square wave signal that is superimposed onto the voltage. To this end, a pulsating DC signal is created in the primary coil 238 of transformer 26 by power mosfet transistor 234 which is driven on and off by oscillator 100. Resistor 136 limits the current in the primary coil 238 of transformer 26 and the transistor 234, and also raises the "Q". Resistor 128 connected to the gate of the power transistor biases the gate to the output signal from the oscillator 100. The pulsating current in the primary coil 238 of transformer 26 causes a pulsating current in secondary coil 240 of the transformer 26. The current in the secondary coil 240 is out of phase with the pulsating current in the primary coil 238. Electrolytic capacitor 242 stores the voltage produced in the secondary coil 140 and then discharges. This causes a triangular wave form on the secondary coil. Capacitor 242 is used only if transformer 26 is not capacitively coupled. Capacitor 242 couples the high end of both coils. Coupling causes a square wave signal to be superimposed on the input voltage thus forming the output signal.

Figure 2:
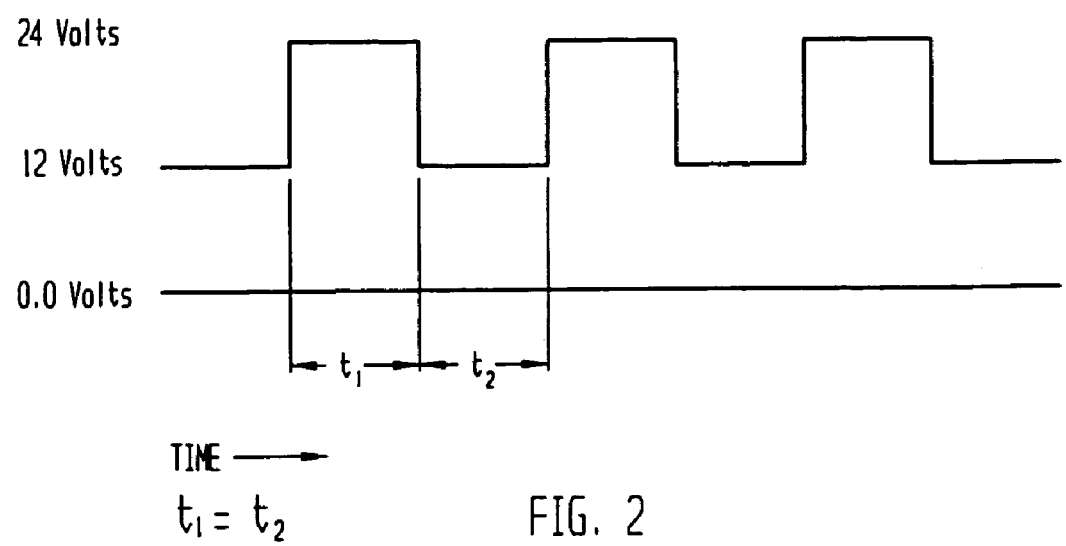
FIG. 2 is a graphical representation of an ideal 10 kilohertz square wave signal superimposed on the rail voltage of a 12 volt battery.
Figure 3:
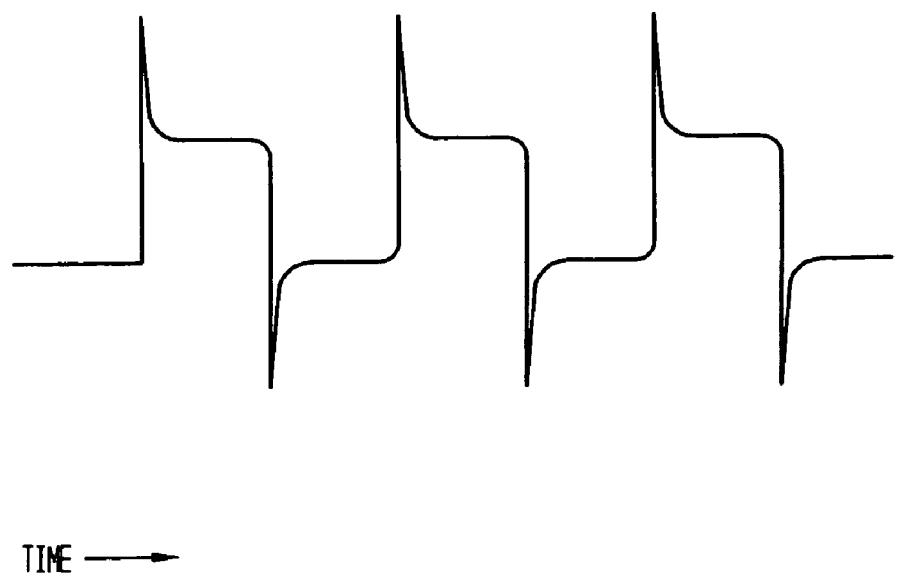
FIG. 3 is a graphical representation of a typical square wave signal as might be produced by the apparatus of my invention taking into consideration capactive effects.

The oscillator 100 can be of any design that will produce a square wave output at a frequency of less than 10 kilohertz and preferably in the range of 3 to 9 kilohertz. The square wave swings between any positive voltage and the negative rail, and should be sufficient to fully turn on transistor 234. In this embodiment the square wave generator is one half of an LM-393 comparator integrated circuit 118. Resistors 112, 114, 116, 120 and 124 with capacitor 122 are sized to cause the comparator to oscillate at the desired frequency, swinging from its positive supply voltage to the negative rail as shown in FIG. 2 with the periods $t_1$ and $t_2$ being substantially equal. In practice it may not be possible to achieve a perfect square wave, but small variations in the wave form, especially voltage spikes at the rising and falling edge result in a substantially square wave and do not affect the effectiveness of the invention. Variations in the duty cycle also do not affect the effectiveness of the invention. This waveform is illustrated in FIG. 3. Preferably, the frequency of the square wave is lower than the lowest natural frequency of any crystal to be dissolved, and is applied for a fixed period sufficient to cause the unwanted crystals to break-up and dissolve. In the case of a vehicle battery and some redox reactions, it is beneficial for the square wave to be applied to the reaction continuously to dissolve crystals as they form.

In some cases, a high DC input voltage may, if high enough, cause damage to the integrated circuit 118. The subject invention is designed to provide a supply voltage to the comparator 118 of less than 30 volts regardless of the design input voltage. Diode 102 protects the comparator 118 from a reverse current in the event the invention is connected to the power source with a reversed polarity.

Resistors 104 and 108 form a voltage divider. This voltage divider reduces the input voltage to less than 30 volts to protect the integrated circuit 118. Electrolytic capacitor 106 filters any fluctuation of voltage caused by the modulated output voltage. A zener diode 110 is used to protect the integrated circuit 118 from over voltage.

A light emitting diode (LED) 130 provides an indicator that the invention is working. It is connected in the circuit so that it will only light if a back EMF is present, caused by the collapsing field in the primary coil 238. Resistor 134 reduces the voltage across LED 130.

Transformer 26 comprises a coil that is constructed to be highly coupled both capacitively and inductively and operates similar to a flyback transformer in function. The turns ratio produces an increase of voltage which is substantially two times the input voltage. An example of the transformer used in the preferred embodiment has a primary coil 238 composed of one hundred sixty five turns of twenty-two gauge wire wound right on top of the secondary coil 240 composed of two hundred five turns of twenty-eight gauge wire and an ETD-34 Ferrite core. Winding the primary 238 on top of the secondary 240 couples the windings sufficiently to eliminate the need for any further coupling.

The effectiveness of the invention is a function of the surface area of crystals to be dissolved and the output current of the invention. Crystals of different sizes will have different resonant frequencies. Output currents from 0.1 amperes to 1.0 amperes have proven effective for square waves of less than 10 kilohertz. The power output of the invention is not limited, but can be designed to match the power required for any surface area.

The low frequency square wave will thus include harmonics in the low frequency range as well as higher frequencies thus effectively stimulating and breaking up a broad range of crystals of various sizes.

Oxidation-reduction reaction processes also takes place in what is called a redox generator or a fixed bed reactor. The application of my invention to this type of reaction involves the addition of a power source and electrodes to the reactor.

Figure 4:
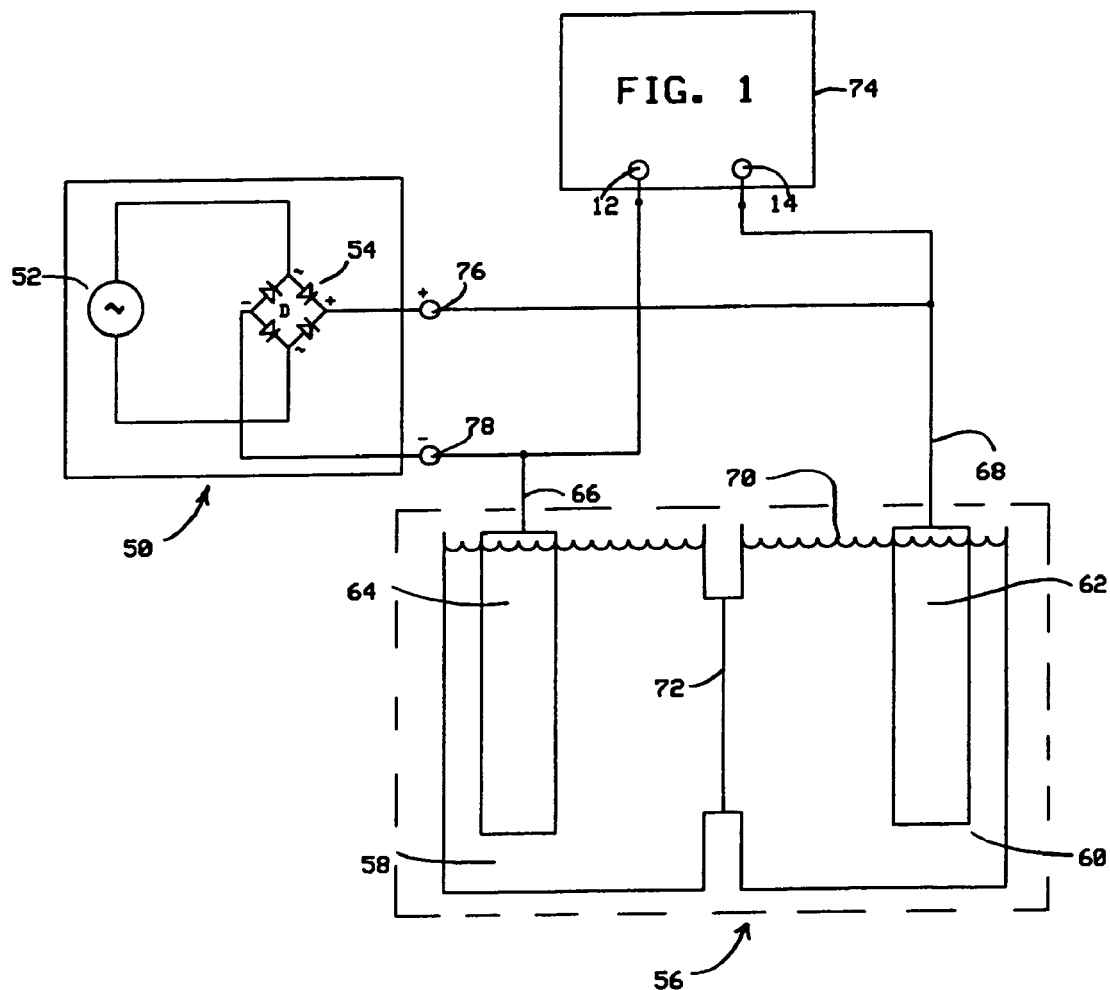
FIG. 4 is a sketch of a redox generator using electrolysis showing the DC power supply with the circuit of FIG. 1.

FIG. 4 shows a redox generator in the general category of electrochemistry. This would include various leaching reactions, electrolysis or hydrolysis of water and batteries. A DC power source 50 which may be composed of an alternating current source 52 and a diode bridge 54 provides power for the redox generator 56 and the square wave generator of my invention 74 through terminals 76 and 78. The DC power is fed through the positive bus 68 and negative bus 66 to the redox generator 56 and terminals 14 and 12, respectively of my square wave generator 74 illustrated schematically in FIG. 1. The redox generator 56 consists of a cathodic chamber 58 at least one cathode (−) electrode 64 submerged in the electrolyte 70, and an anodic chamber 60 with at least one anode (+) electrode 62 which is also submerged in electrolyte 70. The two chambers 58 and 60 are separated by a redox membrane or salt bridge 72. When power is supplied to the buses 66 and 68, ions can pass through the membrane and collect on the respective electrode 64 or 62. At the same time the square wave generator 74 is imposing a square wave signal across the redox generator from the anode 62 to the cathode 64. This square wave signal causes crystals that exist in the electrolyte or on any surface to dissolve. If the redox generator is a battery, multiple anodes and cathodes may be used, placed in the same chamber with a separator membrane between each pair of electrodes. The external power source would be optional with a battery.

Figure 5:
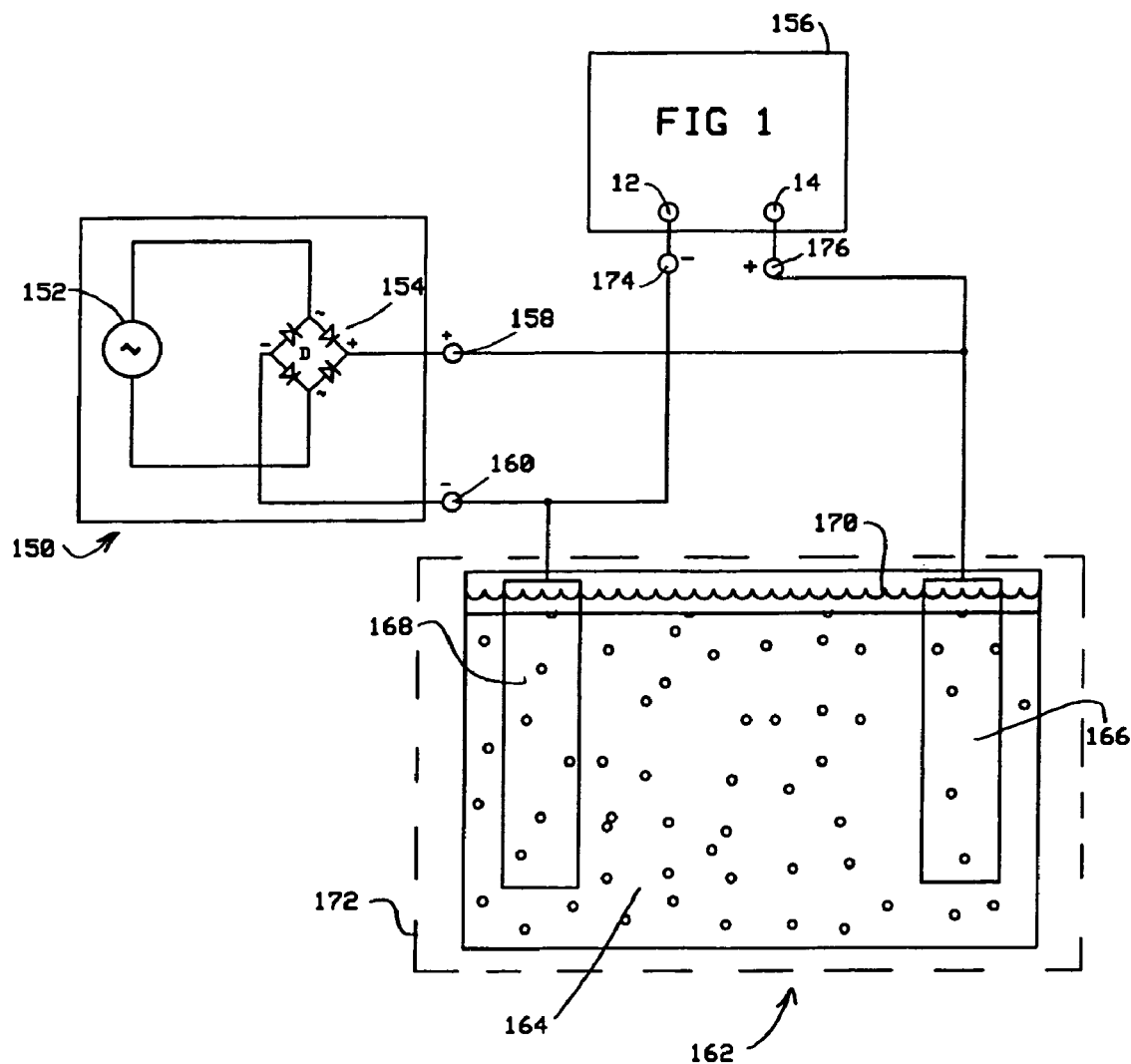
FIG. 5 is an illustration of a redox resin bed generator employing the circuit of FIG. 1 for crystal destruction.

In FIG. 5, the redox reactor 162 includes a reactor vessel 172, a bed of redox resin 164 and the material that is subject to redox 170 is of the fixed bed type and redox resin is commonly available through many suppliers. It generally is produced for the specific purpose of either oxidation or reduction. Redox resin is a material that has a large surface area and molecules of an electron donor or receptor are dispersed over the surface. The donor or receptor molecules are occasionally replaced by ion exchange using a suitable salt. Unwanted crystals that form as result of this process usually cause the resin to be become "exhausted" and therefore replaced.

The life of the resin in a fixed reactor can be extended by use of my invention as shown in FIG. 5. Electrodes 166 and 168 are added to the reactor. A source of DC power 150 must be added to supply the power to the square wave generator 156. The power source 150 may consist of a source of AC power 152 usually from the mains and a rectifier bridge 154 to convert the AC to DC. The positive output 176 of my invention is connected in turn to the positive output 158 from the power source 150 and at least one anode (+) electrode 166. The negative output 174 from my invention 156 is connected to the negative output 160 of the power supply 150 and at least one cathode (−) electrode 168. A square wave signal is subsequently imposed on the rail voltage of the power source and is introduced into the reactor bed, where it dissolves any unwanted crystals. Different sources of power can be used. For instance, a battery can be substituted for the rectified AC power or a generator or alternator can be used. Such power sources are well known in the art.

While a preferred embodiment and several applications of the invention have been described, those skilled in the art will envision possible variations, it is understood that such description is merely illustrative of the underlying principles of the invention and is not intended to be limiting of the scope of the invention and the following claims.

What is claimed is:

1. A method for dissolving crystals formed in a side reaction to an oxidation reduction reaction in a voltage supply source having a direct current rail voltage, comprising:
   imposing an intermittent direct current substantially square wave signal operable for dissolving said crystals upon said direct current rail voltage of the voltage supply source such that said square wave signal operable for dissolving said crystals and said direct current rail voltage are output together for a period of time; and
   generating said square wave signal operable for dissolving said crystals to have a fixed frequency that is lower than a lowest natural frequency of any said crystals to be dissolved.

2. A method as set forth in claim 1 wherein the frequency is less than 10 kHz.

3. A method as set forth in claim 1 wherein the frequency is in the range of 3 to 9 kHz.

4. A method as set forth in claim 1 further comprising maintaining the substantially square wave signal operable for dissolving said crystals for the period of time being sufficient to cause said crystals to break-up and dissolve.

5. An apparatus for dissolving crystals formed in a side reaction to an oxidation reduction reaction in an oxidation reduction reaction environment having a voltage supply source, comprising:
   means for generating substantially square wave signal operable for dissolving said crystals and having a fixed frequency that is lower than a lowest natural frequency of any said crystal to be dissolved, and
   means for imposing the substantially square wave signal operable for dissolving said on crystals on a direct current rail voltage of said voltage supply source such that said square wave signal operable for dissolving said crystals and said direct current rail voltage are output together for a period of time.

6. An apparatus as set forth in claim 5 wherein the frequency is less than 10 kHz.

7. An apparatus as set forth in claim 5 wherein the frequency is in the range of 3 to 9 kHz.

8. An apparatus as set forth in claim 5 further including means for maintaining the substantially square wave signal operable for dissolving said crystals for the period of time being sufficient to cause said crystals to break-up and dissolve.

* * * * *

UNITED STATES PATENT AND TRADEMARK OFFICE
CERTIFICATE OF CORRECTION

PATENT NO.       : 7,374,839 B2  
APPLICATION NO.  : 10/926995  
DATED            : May 20, 2008  
INVENTOR(S)      : Charles A. Van Breemen Page 1 of 1

It is certified that error appears in the above-identified patent and that said Letters Patent is hereby corrected as shown below:

Column 6, Line 49 – Delete "on" before "crystals"

Signed and Sealed this

Nineteenth Day of August, 2008

JON W. DUDAS  
*Director of the United States Patent and Trademark Office*